Figure 1:
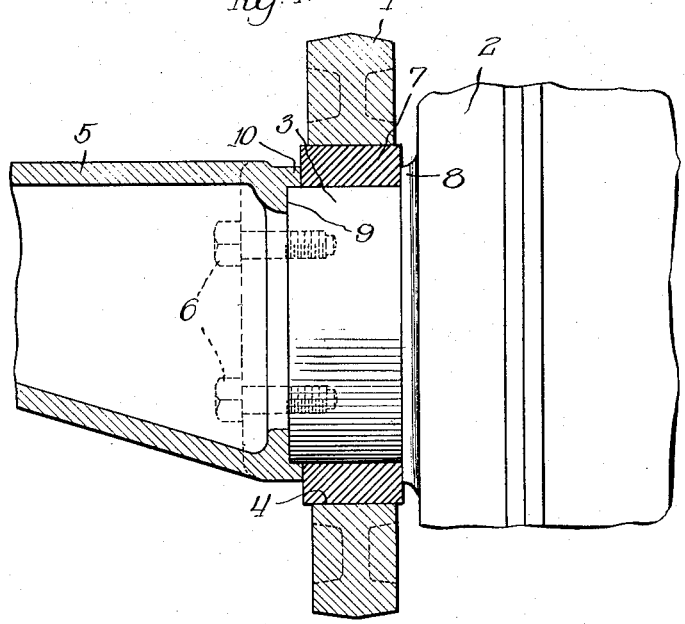

Sept. 20, 1927.

J. RIISE 1,642,697

MOTOR SHOCK INSULATING MEANS

Filed Sept. 21, 1925

Witness:
R. Burkhardt

Inventor:
John Riise,
By Wilkinson, Huxley, Byron & Knight
attys.

Patented Sept. 20, 1927.

1,642,697

UNITED STATES PATENT OFFICE.

JOHN RIISE, OF DOYLESTOWN, OHIO.

MOTOR SHOCK-INSULATING MEANS.

Application filed September 21, 1925. Serial No. 57,619.

The present invention relates to motor shock insulating means.

More particularly the present invention relates to mountings for the motor of an automobile or the like. It is common practice in automobiles to provide a three-point suspension for the motor. As said mountings are provided, however, there is a great deal of vibration between the motor and its supporting means, which vibration is noisy and causes wear. Even when the tolerance of the interfitting parts is reduced to a very small amount, vibration and noise are encountered.

An object of the present invention is to provide support means for an automobile motor which will cushion the vibration and which is readily adaptable to present designs of automobiles.

A further object is to provide a simple structure which will cooperate with the ordinary design of motor to provide a non-vibratory support for said motor.

Further objects will appear as the description proceeds.

Referring to the drawings—

Figure 2:
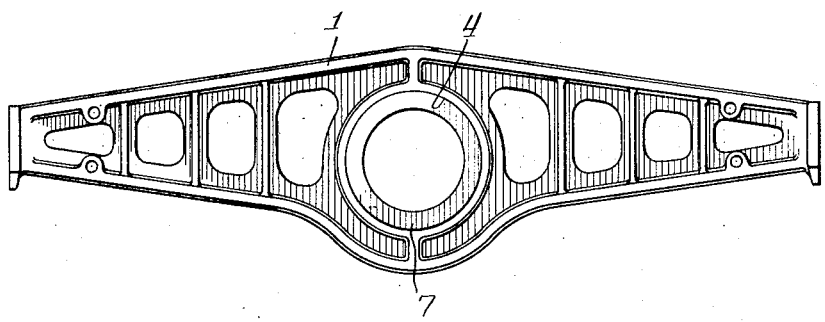

Figure 1 is a fragmentary view illustrating parts of an automobile motor, a motor support bracket, and a radiator and starting crank bracket; and Figure 2 is a view in front elevation of the motor support bracket.

A motor support bracket is indicated by the numeral 1, which bracket is mounted upon the frame of an automobile. Said bracket 1 is adapted to support one end of the automobile motor 2, said automobile motor being provided with a cylindrical end portion 3 adapted to occupy a position within a circular hole 4 in the bracket 1. The numeral 5 indicates a bracket for supporting the radiator and starting crank. Said bracket 5 is bolted to the cylindrical portion 3 of the motor 2 by means of bolts 6—6.

The numeral 7 indicates a ring of cushioning material such as rubber. Said ring is of a size, when not under stress, to have an easy slip fit upon the cylindrical portion 3 of the engine 2 and within the hole 4 of the bracket 1. The motor 2 is provided with a shoulder portion 8 of slightly greater diameter than the diameter of the cylindrical portion 3 of said motor 2, though the diameter of said shoulder 8 should be of less diameter than the hole 4 of the bracket 1. The bracket 5 is recessed, as indicated by the numeral 9, to provide an annular flange 10 adapted to bear against one end of the cushioning ring 7. The other end of said cushioning ring 7 abuts against the shoulder 8 of the engine 2. Said annular flange 10 is also preferably of less diameter than the hole 4 in the bracket 1, whereby opportunity is provided for flow of the material of the cushioning ring 7 when said cushioning ring is put into a state of compression. In order to facilitate the flowing of the material of the ring 7, said ring 7 may have a greater axial dimension than that portion of the bracket 1 with which it engages. Under compression, therefore, the material of the ring 7 has an opportunity to flow both radially and axially adjacent to the outer edge portions of said ring member 7.

In the practice of the present invention the flange 10 on the bracket 5 will be of such a length that when said bracket 5 is mounted in position upon the cylindrical extremity of the motor 2 said flange 10, in cooperation with the shoulder 8, will put the material of ring 7 in a state of compression, so that said ring 7 will have a tight fit upon the cylindrical portion 3 of the motor 2 and within the hole 4 of the bracket 1.

When relative movement occurs between the motor support bracket 1 and the motor 2, the material of the ring 7 will flow at its two outer edges, whereby the shocks due to vibration will be cushioned and noise and wear upon the parts will be substantially reduced. The invention is simple and requires only slight modification of automobile structure as now commonly used.

Though a preferred embodiment of the present invention has been described in detail, it will be understood that many modifications will occur to those skilled in the art. It is intended to cover all such modifications that fall within the scope of the appended claims.

What is claimed is—

1. In an automobile, a motor support bracket, a motor having a cylindrical end portion mounted within said bracket, a second bracket secured to said motor, and a cushioning ring mounted upon said motor coaxially with said cylindrical end portion within said support bracket, said ring being held in a state of compression in a direction parallel with the axis of said cylindrical end portion between said motor and said second bracket.

2. In an automobile, a motor support bracket, a motor having a cylindrical end portion mounted within said bracket, a second bracket secured to said motor, and a cushioning ring mounted upon said motor coaxially with said cylindrical end portion within said support bracket, said ring being held in a state of compression in a direction parallel with the axis of said cylindrical end portion between said motor and said second bracket, said ring having part thereof free from said brackets and motor, whereby flow of the material of said ring may occur under shock.

3. In an automobile, in combination, a motor support member, a motor having a cylindrical end portion mounted within said member, a second member secured to said motor, a cushioning ring between said support member and said motor coaxially with said cylindrical end portion, said second member having a portion for holding said ring in a state of compression in a direction parallel with the axis of said cylindrical end portion between said second member and said motor.

4. In an automobile, in combination, a motor support member, a motor having a portion mounted within said member, a second member secured to said motor, a cushioning ring between said support member and said motor, said second member having a portion for holding said ring in a state of compression between said second member and said motor, said ring being of greater diameter than adjacent portions of said second member and said motor, whereby flow of the material of said ring may occur under shock.

5. In combination, in an automobile, a motor supporting member, a motor having a cylindrical portion mounted within said supporting member, a second member carried by said cylindrical portion, a shoulder upon said motor adjacent to said cylindrical portion, a cushioning ring, said cushioning ring being of a size, when not under stress, to have an easy fit upon said cylindrical portion and within said supporting member, said second member having a portion cooperating with said shoulder for holding said cushioning ring in a state of compression.

6. In combination, in an automobile, a motor supporting member, a motor having a cylindrical portion mounted within said supporting member, a second member carried by said cylindrical portion, a shoulder upon said motor adjacent to said cylindrical portion, a cushioning ring, said cushioning ring being of a size, when not under stress, to have an easy fit upon said cylindrical portion and within said supporting member, said second member having a portion cooperating with said shoulder for holding said cushioning ring in a state of compression, said cushioning ring having portions free from said supporting member, motor and second member, whereby flow of the material of said ring may occur under shock.

Signed at Doylestown, Ohio, this 17th day of September, 1925.

JOHN RIISE.